Figure 1:
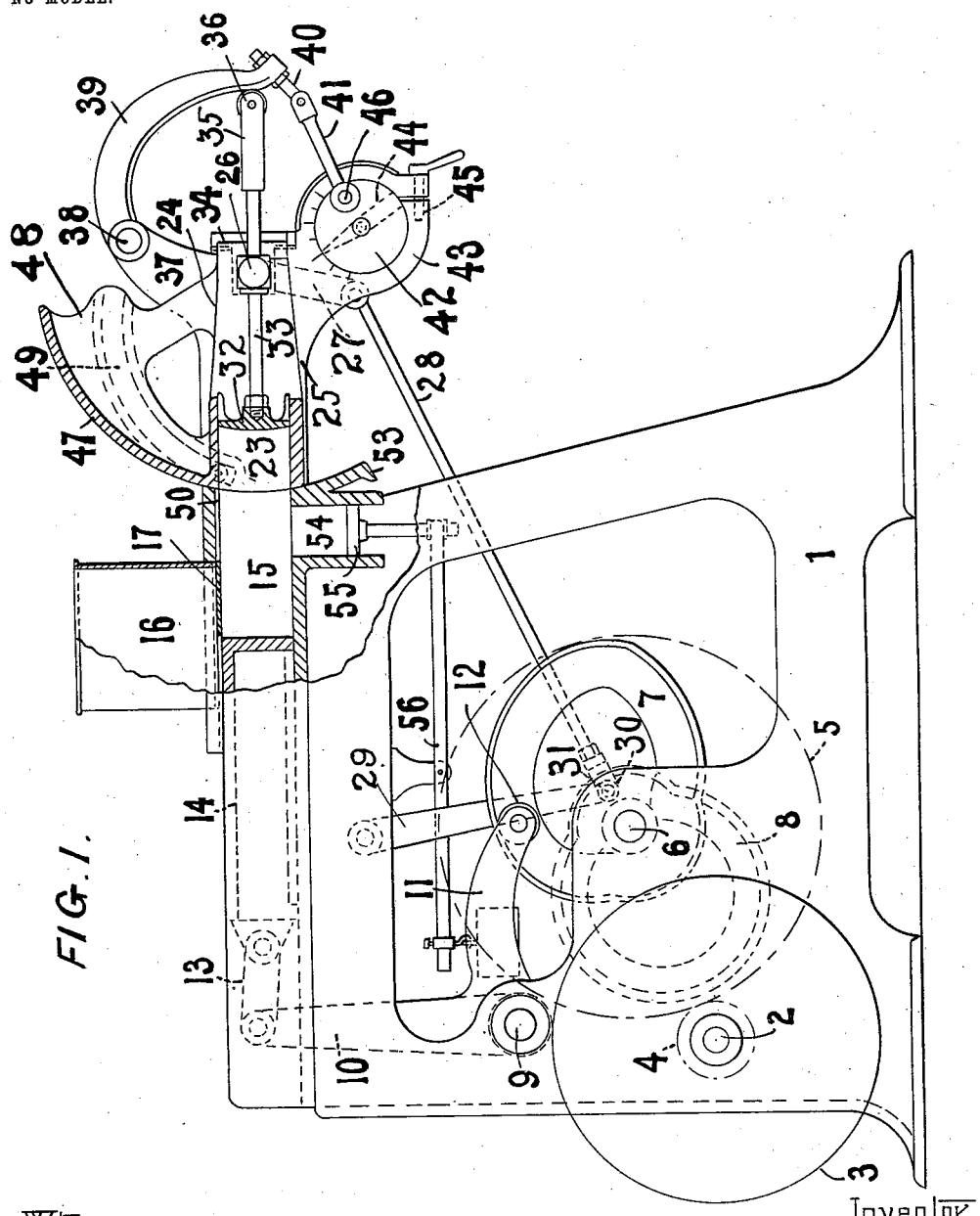

No. 749,023. PATENTED JAN. 5, 1904.
J. CALLOW.
APPARATUS FOR DIVIDING AND COMPRESSING OR MOLDING DOUGH
OR LIKE PLASTIC MATERIALS.
APPLICATION FILED JUNE 19, 1903.
NO MODEL. 2 SHEETS—SHEET 1.

Witnesses
William T. Jones.
Edgar M. Kitchin.

Inventor
John Callow,
By Mason Fenwick Lawrence
attorneys

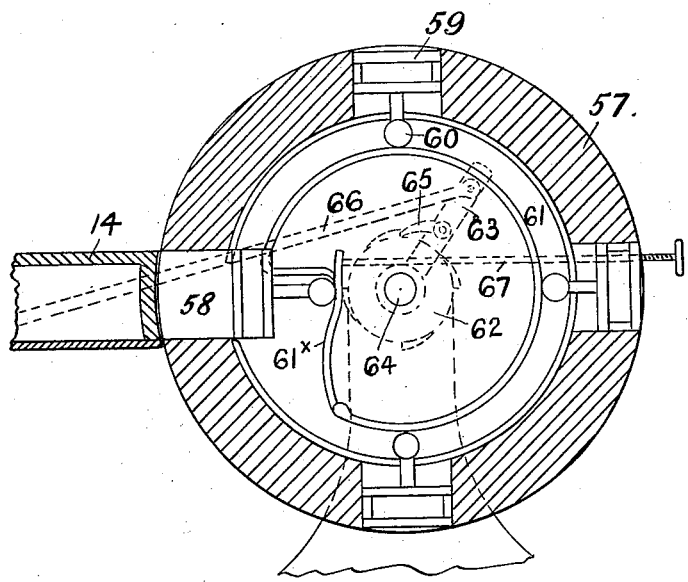

No. 749,023. Patented January 5, 1904.

UNITED STATES PATENT OFFICE.

JOHN CALLOW, OF LIVERPOOL, ENGLAND.

APPARATUS FOR DIVIDING AND COMPRESSING OR MOLDING DOUGH OR LIKE PLASTIC MATERIALS.

SPECIFICATION forming part of Letters Patent No. 749,023, dated January 5, 1904.

Application filed June 19, 1903. Serial No. 162,231. (No model.)

*To all whom it may concern:*

Be it known that I, JOHN CALLOW, foreman baker, a subject of the King of Great Britain, and a resident of Liverpool, in the county of Lancaster, England, (whose post-office address is 2 Rokeby street, Liverpool, aforesaid,) have invented certain new and useful Improvements in Apparatus for Dividing and Compressing or Molding Dough or Like Plastic Materials, (for which application has been made in England, No. 1,986, dated January 27, 1903,) of which the following is a specification.

This invention relates to apparatus for dividing dough or like plastic material into compressed lumps of predetermined size or shape and weight and discharging said lumps intermittently.

This invention has for its object certain improvements in my prior United States Patent application, Serial No. 132,624.

I will describe the complete machine with the improvements added.

In the accompanying drawings, Figure 1 is a side elevation, partly in section, of the machine; Fig. 2, a sectional view of a slightly-modified arrangement.

Referring first to Fig. 1, I mount in the lower part of the framework 1 a pulley-shaft 2, which carries fast and loose pulleys 3 outside the framework and a pinion 4 within said framework. Pinion 4 gears with a toothed wheel 5, and this latter is mounted on a shaft 6, which constitutes the principal actuating-mover of the machine. On shaft 6 is a cam 7, which is designed to operate the plunger, and a second groove-cam 8, which operates the receivers. On shaft 9 an elbow-lever 10 11 is mounted, the arm 11 of which carries roller 12, which works in the groove of cam 7, and arm 10 is connected by a link 13 to a broad plunger 14. This plunger is approximately rectangular, preferably made hollow and having strengthening-ribs, although of course any other suitable form of plunger might be used. The plunger works in a chamber 15 beneath a hopper 16, to which latter the materials are suitably fed. 17 is a cut-off plate which comes forward as the plunger 14 advances and separates the plastic material in the hopper from the portion which is being pressed forward by the plunger in the chamber 15. The means for operating the plate 17 is connected with the receivers 23 and will be described in relation thereto. The receivers 23 are either square or round, and the required number of them are mounted in a framework 24 side by side, which is capable of partially rotating around pivots 26 in the brackets 25 of the frame 1. On one of the pivots 26 an arm 27 is fixed, and a rod 28 is hinged to the end of this arm, its other end being hinged to a link-arm 29, which is hung from the frame 1. At the connection-point 30 between the arms 28 and 29 is arranged a roller-pin or the like 31, which works in the groove of a cam 8. As the cam rotates the rod 28 is drawn backward and pushed forward at intervals, turning the receivers 23 down and raising them again to the position opposite the ends of the cylinders. Pistons 32 are arranged one in each receiver 23, and rods 33 from these pistons pass through a guide 34 in frame 24 and end in forks 35, carrying rollers 36. At the sides of brackets 25 arms 37 project upward and carry a cross-shaft 38. On this shaft are as many curved arms 39 as there are receivers 23, each arm being opposite the end of one of the receivers. The ends of arms 39 are connected by links 40 41 to a cross-rod 46, the ends of which fit in the faces of two disks 42, which are mounted in split rings 43 under the brackets 25. The disks are provided with handles 44, by which they may be turned, and the screw-pins 45 serve for tightening the rings around the disks and locking the latter. The rollers 36 bear upon the inner edges of the curved arms 39, and as the receivers are tilted downward by the rod 28 the rollers travel over the arms 39, thus gradually forcing the pistons 32 toward the mouths of their receivers. By turning the disks 42 it will be seen that the links 40 41 are drawn inward, bringing with them the curved arms 39, and consequently reducing the distance which pistons 32 can move back in their receivers and the amounts which those receivers will then hold. The rings may be graduated, if desired, at the edges near the disks, Fig. 1, and an arrow on each disk will then point to the graduation corresponding to the volume of the receivers or, if preferred, to the weight of a particular material, such as dough, which will enter each receiver when the disk is turned to a given position. A plate 47, curved to the arc of a circle around the center 26, serves to close the mouths of the chambers 15 while the receivers 23 are turned down for discharging. While pivoting downwardly, the receivers 23 are temporarily closed by a curved plate 53, extending from the chamber 15. The upper parts of the plate are supported by side pieces or plates 48, which rigidly connect it with the tilting framework 24, and each plate 48 has an eccentric groove 49 therein. Rods 50, connected to the cut-off plate 17, are provided with pins or rollers which engage in these grooves 49, the arrangement being such that the plate 17 is drawn by the rods 50 and grooves 49 away from the opening of the hopper when the frame 24 tilts and is returned into the position shown in Fig. 1 by the action of the grooves and rods when the frame 24, with the receivers, is brought back again into the receiving position.

In order to prevent too great a compression of the dough in the chambers and receivers, I provide recesses 54, each fitted with a piston 55, which is acted on by the weighted lever 56. The piston 55 normally takes up a position flush with the inside wall of the chamber 15; but when the requisite compression has been reached any excess of pressure of the dough forces down the piston 55, which thus acts as a safety device for preventing undue pressure. After completion of the compression and when the plunger recedes the weighted lever 56 lifts the piston, and the excess dough in the recess 54 is discharged into the chamber 15.

In a modified form of construction the single row of oscillating receivers 23 are replaced by a drum 57, Fig. 2, in the periphery of which four or any suitable number of rows of receivers 58 are formed, and in each receiver is fitted a plunger 59. A projection 60 on each of the latter plungers or on the ends of the rows of plungers engages in a cam or eccentric slot 61, by which means when the drum 57 is revolved the plungers 59 in the row of receivers opposite the ends of the chambers are withdrawn inward and during a quarter-rotation of said drum 57 are moved outward in their receivers until they lie flush with the surface of the drum. On one face of the drum is a ratchet-wheel 62, having as many teeth as there are rows of receivers, and upon crank 63, which is loosely mounted upon the shaft 64, a pawl 65 is provided, which engages in the teeth of said ratchet 62. The length of this pawl-carrying crank 63 is such that at each stroke of the actuating-rod 66 said crank 63 is oscillated through a sufficient angle to cause the pawl 65 to engage the ratchet 62 and turn it one tooth forward, whereby the drum 57 is rotated the segment of a circle to bring a new row of receivers 58 opposite the ends of the chambers in which the plungers 14 work. More than one such operating pawl-and-ratchet mechanism may be provided, if desired. The movement of the drum is thus intermittent, the receivers which are opposite to the chamber ends remaining in that position, while the plungers 14 in the chambers move forward and being moved round through a quarter-turn, if there are four rows of receivers in the drum, while the plungers 14 in the chambers are being drawn back. The position of the adjustable parts of the eccentrics or cams 61 may be adjusted by means of a rod 67 with hand-wheel. This rod is screwed through a stationary nut, so that by turning the handle the part 61$^X$ is moved and will cause the plungers 59 in the receivers to have a greater or less movement, and consequently to allow more dough to enter said receivers at each feed or to allow of the dough being less compressed.

The mode of action is as follows: At each forward movement of the plungers 14 in the chambers a lump of dough is fed forward and is forced into the receivers in the drum opposite the end of said chamber, the device 54, described in connection with the previous figures, preventing too great compression of the dough. While the plungers in the chambers are being drawn back to open the hopper-mouths and to obtain a fresh feed of dough, the drum is revolved by the ratchet mechanism, and the plungers 59 in the row of receivers containing the compressed lumps of dough are moved outward in said receivers and the dough thereby discharged. The movement of the drum 57 is so calculated that one row of receivers is in front of the chambers when the plungers 14 are moving forward with charges of dough, and then after receiving a charge of dough the drum is turned a part of a turn, the compressed and molded dough discharged, and another row of empty receivers brought into position.

I have presented no claim in the present application for the structure disclosed in Fig. 2 of the drawings, the same constituting the subject-matter for claims of a divisional application.

I declare that what I claim is—

1. In a device of the character described the combination of a frame, a hopper carried thereby, a chamber mounted under said hopper, a hollow piston operating within said chamber and oscillating mechanism provided with receiving-chambers journaled upon said frame and acting in conjunction with the piston carried within said chamber and means formed upon the chamber for relieving the pressure within the said chamber when the machine is in operation.

2. A machine of the character described comprising a receiving-chamber, compressing means therefor, a relieving mechanism for said chamber, an oscillating mechanism carrying a series of receiving-chambers and reciprocating means mounted within said chambers, means for controlling the actuation of said reciprocating means and means for actuating said oscillating member simultaneously with the actuation of the means for operating the compressing means mounted within the receiving-chamber.

3. In a device of the character described the combination of a receiving-chamber and piston therefor, of a relieving mechanism carried by said receiving-chamber, and receiving mechanism provided with a series of compartments operating in connection with the receiving-chamber, means for oscillating said receiving means and means simultaneously actuated for imparting action to the receiving-chambers, substantially as described.

4. An apparatus for dividing, compressing and molding plastic material comprising a frame and receiving-chamber mounted thereon, a piston reciprocating within said chamber, of a relieving mechanism for said chamber comprising a piston suitably mounted within the casing said piston governed by weighted means, an oscillating frame mounted upon the first-mentioned frame, said frame provided with a series of receivers, a pivoted mechanism acting in conjunction with said pistons for controlling the movement thereof and means for imparting motion to said oscillating casing and the piston retained within the receiving-chamber.

5. An apparatus for dividing, compressing and molding dough comprising receiving-chambers and compressing means therefor, a relieving mechanism for said receiving-chambers comprising a chamber provided with a piston and a weighted lever connecting said piston for controlling the action thereof, auxiliary receiving-chambers assembled with the primary receiving-chambers and means for simultaneously actuating the said receiving-chambers and the mechanism carried thereby.

6. An apparatus for dividing, compressing and molding dough or the like comprising a frame, receiving-chambers mounted thereon, a series of hollow pistons mounted within said receiving-chambers, a relieving mechanism assembled with each receiving-chamber, a series of receiving-chambers mounted in a horizontal plane upon said casing and provided with means for oscillating the same, said means simultaneously actuating and co-acting with the means for operating the pistons carried by the stationary receiving-chambers.

7. In a machine for dividing plastic material, the combination with the chambers and receivers, of recesses therein each fitted with a piston and means acting upon said pistons so as to normally take up a position flush with the inside wall of the chamber but when the requisite compression has been reached any excess of pressure of the plastic material forces down the piston which thus acts as a safety device for preventing undue pressure, substantially as described.

In witness whereof I have hereunto signed my name, this 10th day of June, 1903, in the presence of two subscribing witnesses.

JOHN CALLOW.

Witnesses:
HUBERT PUMPHREY,
F. P. EVANS.